United States Patent [19]
Colpitts

[11] 3,870,179
[45] Mar. 11, 1975

[54] SPARE WHEEL CARRIER FOR LOGGING TRUCKS

[76] Inventor: Willard E. Colpitts, Box 324, Dayville, Oreg. 97825

[22] Filed: June 1, 1973

[21] Appl. No.: 366,994

[52] U.S. Cl. .............................................. 214/454
[51] Int. Cl. .............................................. B62d 43/00
[58] Field of Search ......... 214/451, 454; 224/42.21, 224/42.06, 42.23, 42.24; 254/108

[56] References Cited
UNITED STATES PATENTS

| | | | |
|---|---|---|---|
| 386,954 | 7/1888 | Baldwin | 254/108 |
| 1,405,378 | 1/1922 | Lawrence | 214/454 |
| 1,723,320 | 8/1929 | Zibelman | 214/454 |
| 2,701,670 | 2/1955 | Hutchinson | 224/42.24 |

Primary Examiner—Robert J. Spar
Assistant Examiner—Ross Weaver
Attorney, Agent, or Firm—Bacon & Thomas

[57] ABSTRACT

A bracket is mounted on the truck frame, and includes spaced back and face plates between which a ratchet bar is slidably mounted for vertical movement. The ratchet bar carries a stud bolt to which a spare wheel is secured while the wheel is resting on the ground, and thereafter a jack handle and dog carried by the bracket are operated to elevate the spare wheel into its carriage position. The spare wheel is locked in its carriage position by bolts inserted through the lug holes therein, and which are threaded into nuts welded to the bracket. Lowering and removal of the spare wheel is done by operating the dog and the jack handle in a reverse manner.

6 Claims, 7 Drawing Figures

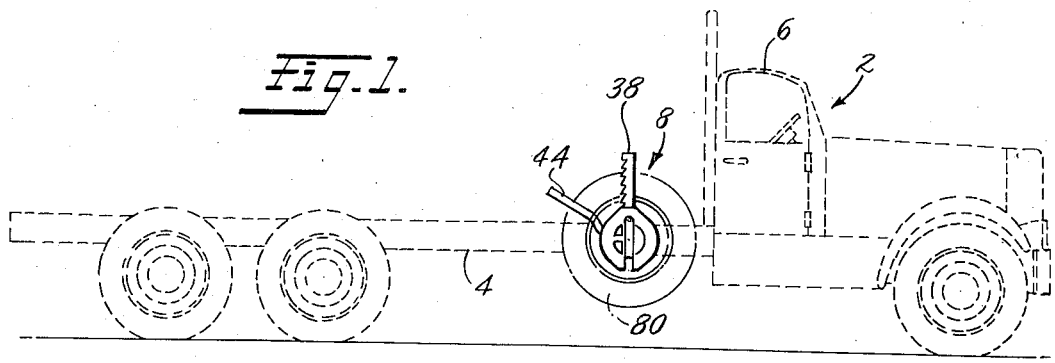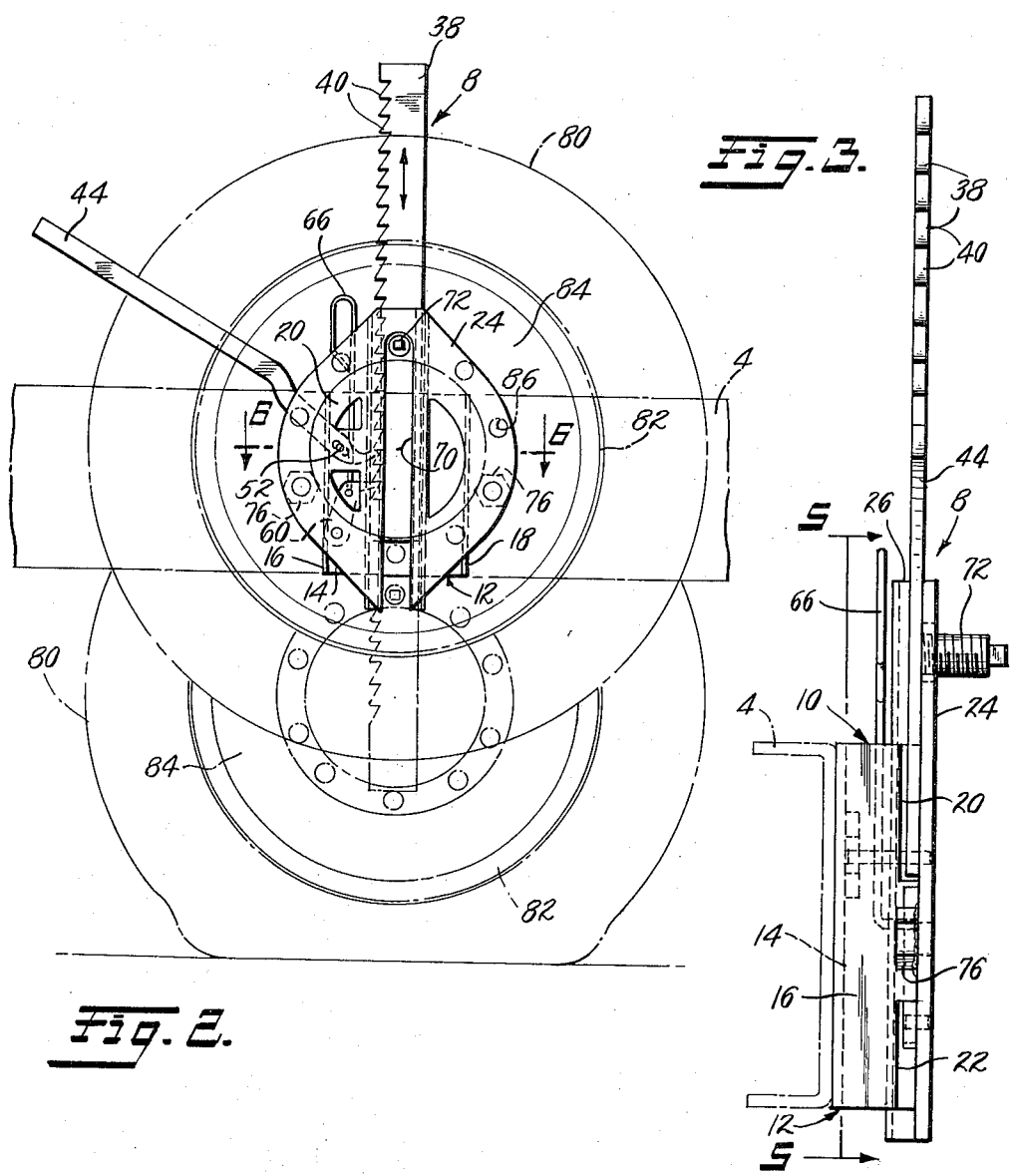

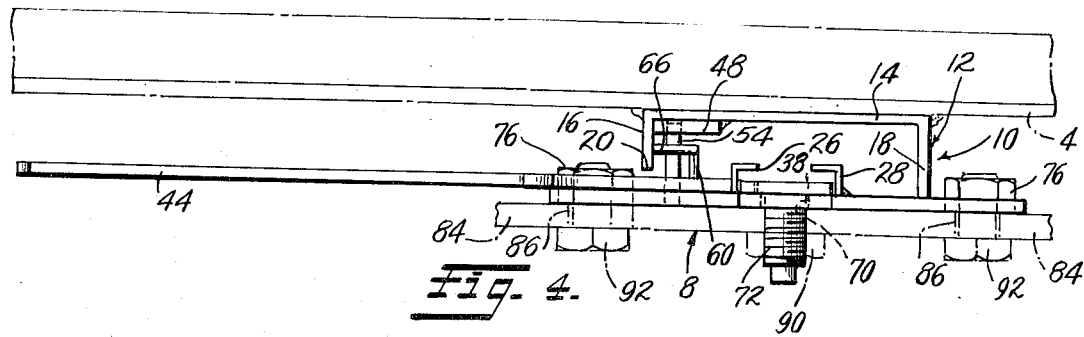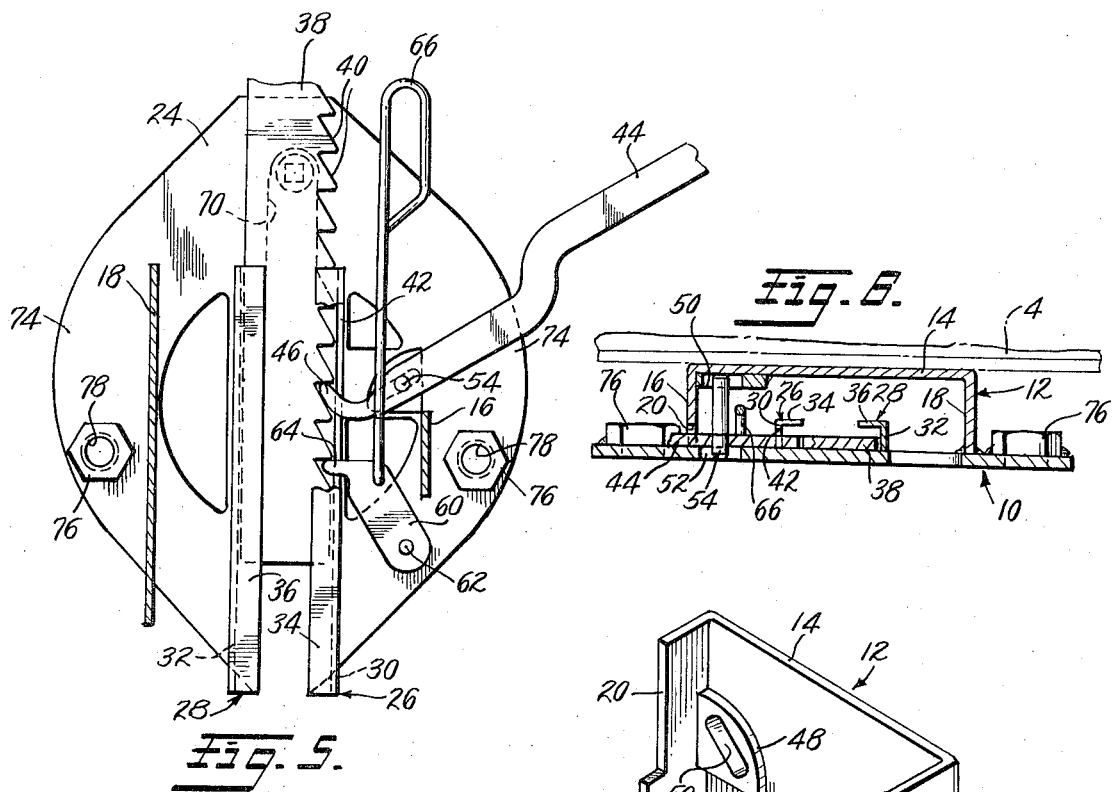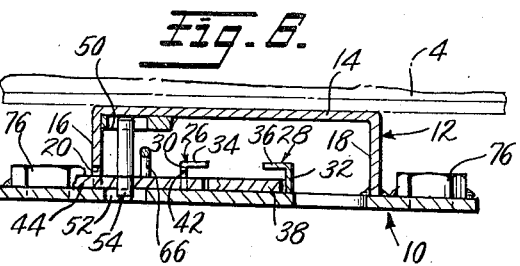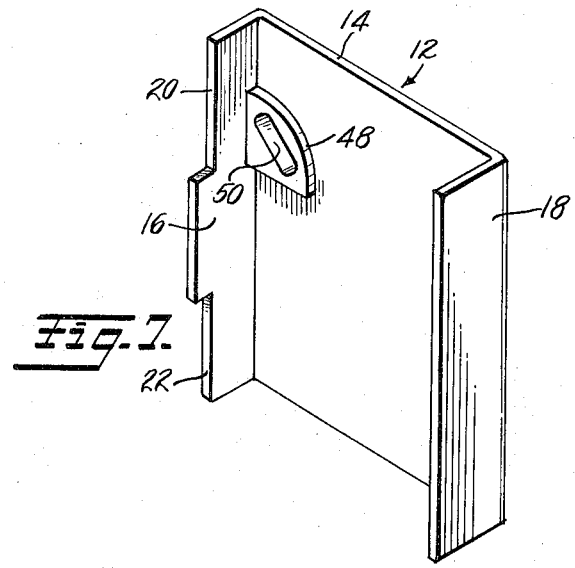

3,870,179

1

SPARE WHEEL CARRIER FOR LOGGING TRUCKS

BACKGROUND OF THE INVENTION

1. Field of the Invention

The present invention relates generally to a device for carrying a spare wheel on a vehicle. More particularly, it relates to a device for carrying a spare wheel on a logging or like heavy duty truck, and which includes means for easily moving the heavy spare wheel from ground level to its carriage position, and return.

2. Description of the Prior Art

It has long been the practice to carry a spare wheel and tire assembly on a motorized vehicle such as an automobile or truck, to be available for use should one of the tires on the vehicle become damaged and unusable. In the case of automobiles, a wheel and tire assembly is relatively light in weight, and can be lifted and handled by an adult person with no great difficulty. Thus, the storage of such spare wheels in automobiles, and similar light duty vehicles, is not a serious problem.

In the instance of heavy logging trucks, however, a tire and wheel assembly will frequently weigh in the neighborhood of 250 pounds and beyond. Thus, the spare wheel for such a logging truck can be very difficult for a single person to handle, especially with respect to mounting it in and removing it from the conventional spare wheel carrying bracket provided on a heavy duty truck. Because of the difficulty in handling the spare wheel for such heavy duty vehicles, two men and extra equipment are frequently employed to change a damaged wheel and tire assembly, and even then the persons involved can encounter excessive physical strain.

Over the years several spare wheel carriers have been devised for motor vehicles, such as are the subject of U.S. Pat. Nos. 1,405,378, 1,723,320, 1,731,204, 2,355,980, 2,377,149, 2,775,358 and 2,855,118. However, such carriers are not directed to the unique problems found with heavy duty trucks such as are used in logging, wherein a very heavy tire and wheel assembly must be handled, frequently by one man working alone. There is thus a need for a spare wheel carrier for such heavy duty trucks, a need which the present invention is intended to satisfy.

SUMMARY OF THE INVENTION

The spare wheel carrier of the present invention is designed to be welded or otherwise secured to the frame of the truck just behind the car, where access thereto can be easily had by the operator. The carrier includes a bracket member mounted on the truck frame, and which comprises a back plate and a face plate mounted in spaced, parallel relationship. The face plate carries a pair of confronting, vertical guide members thereon, which slidingly receive a vertical ratchet bar. The ratchet bar has teeth along one vertical side edge thereof, and carries a stud bolt on its front surface positioned to be received through one of the lug bolt openings in a wheel assembly. The face plate of the bracket has a vertical, downwardly opening notch therein to accommodate the stud bolt as the ratchet bar is moved vertically to its raised position, and carries a pair of nuts thereon positioned to be aligned with other lug bolt openings in a wheel assembly when such assembly is in its elevated, carriage position.

Also mounted between the back and face plates of the bracket is one end of a jack handle, the nose of the handle being designed to engage with the teeth on the ratchet bar, and the handle being pivotally and slidably mounted so that it can be manipulated to raise and lower the ratchet bar by engaging and disengaging with the teeth thereon. Mounted on the bracket for holding the ratchet bar in a selected elevated position is a pivoted dog, which when desired can be released by an attached wire handle to lower the ratchet bar.

In use, the ratchet bar is first placed in its lowered position, and the spare wheel is mounted on the stud bolt, being held in place by a securing nut. The handle is then manipulated, in cooperation with the pivoted dog, to elevate or jack the wheel assembly into its carriage position, wherein the nuts carried by the bracket are in alignment with lug holes in the wheel. Securing bolts are then passed through the lug bolt openings and are threaded into the bracket nuts, thereby firmly attaching the spare wheel. When the spare wheel is thus mounted in its carriage position, the truck to which the carrier is attached can be put to any normal heavy duty use without danger of losing the spare wheel.

When the spare wheel is needed, the securing bolts are removed, and the handle and dog are manipulated to lower the wheel to the ground, whereupon the wheel is freed from the stud bolt on the ratchet bar. Thereafter, the spare wheel can be simply rolled to where it is needed.

It is thus seen that with the carrier of the invention no direct lifting of the heavy truck wheel assembly is required to either place it in or remove it from its carriage position. Therefore, one person can easily handle the wheel. Moreover, as will be appreciated, the straightforward design of the present carrier makes the same economical, and rugged for use under the most adverse of conditions.

It is the principle object of the subject invention to provide a spare wheel carrier for logging trucks and the like, wherein a spare wheel can be placed in and removed from its carriage position by a single operator, without causing undue physical strain.

A further object is to provide a spare wheel carrier that is economical to construct, and rugged in operation.

Yet another object is to provide a spare wheel carrier wherein the spare wheel is carried in an elevated position above the road, but so that it can be easily reached when needed.

A still further object of the invention is to provide a spare wheel carrier including integral jack means for use in lifting the spare wheel free of the road and into its carriage position.

Other objects and many of the attendant advantages of the present invention will be readily apparent from the following Description of the Preferred Embodiment, when taken in conjunction with the accompanying drawings.

BRIEF DESCRIPTION OF THE DRAWINGS

FIG. 1 is a diagrammatic side elevational view of a logging truck with the spare wheel carrier of the invention mounted on the truck frame on the curb side thereof, and shows the ease of access to the spare wheel;

FIG. 2 is an enlarged front elevational view of the spare wheel carrier of FIG. 1, with both the elevated or carriage position of the spare wheel and the lowered position thereof being shown in phantom lines;

FIG. 3 is a side elevational view of the carrier of FIG. 2, as viewed from the left thereof;

FIG. 4 is a top view of the carrier of FIG. 2;

FIG. 5 is an enlarged, rear vertical sectional view of the carrier, taken on the line 5—5 in FIG. 3;

FIG. 6 is an enlarged, horizontal sectional view, taken on the line 6—6 of FIG. 2; and FIG. 7 is an isometric view of the back plate of the carrier bracket.

DESCRIPTION OF THE PREFERRED EMBODIMENT

Referring now to the drawings, a logging truck is indicated generally at 2, and includes a frame 4 which extends rearwardly from the cab 6. Mounted on the frame 4 is the spare wheel carrier 8 of the invention, which includes a bracket 10 having a channel-shaped base member 12 including a back plate 14 that is welded or otherwise secured to the frame 4, and upstanding side members 16 and 18. The base member 12 is shown in perspective in FIG. 7, wherein can clearly be seen upper and lower notches 20 and 22 cut in the front edge of the side member 16.

Welded to the front edges of the side members 16 and 18 is a face plate 24, to the rear face of which are welded confronting, vertically disposed parallel guide members 26 and 28, each including an upstanding wall 30 or 32, respectively, having an inturned flange 34 or 36 thereon. The guide members 26 and 28 serve to mount a ratchet bar 38 for vertical sliding movement, the bar 38 being elongated, rectangular in configuration, and having ratchet teeth 40 along one vertical edge thereof.

The ratchet bar 38 is mounted with the teeth 40 facing the side member 16 of the base member 12, and the confronting upstanding wall 30 of the guide member 26 has an elongated slot opening 42 therein which gives access to the teeth 40. The notch opening 20 together with the face plate 24 forms a slot for receiving one end of a jack handle 44 having an arcuate, finger-like nose portion 46 that is received through the slot 42 to engage the teeth 40. The front side of the back plate 14 of the bracket 10 has a boss 48 welded thereto adjacent the notch 20, and the boss 48 has an angled slot 50 therein that is in alignment with a similar angled slot 52 in the face plate 24. A transversely disposed pivot pin 54 is carried by the jack handle 44, and the opposite ends thereof are received in the angled, confronting slots 50 and 52.

Thus, as is readily seen from the drawings, the jack handle 44 can be manipulated to move the hooked nose portion 46 thereof into engagement beneath one of the ratchet teeth 40, after which downward movement of the outer end of the jack handle will result in upward movement of the ratchet bar 38. The jack handle 44 can be disengaged from the teeth 40 merely by pulling on it to move the pivot pin 54 longitudinally of the slots 50 and 52, until the nose portion 46 of the handle 44 is free of the teeth 40. Then the handle 44 can be pivoted upwardly, and slid inwardly toward the ratchet bar 38 to engage another tooth 40.

The ratchet bar 38 is held in an elevated position within the bracket 10 by a dog 60, which is pivoted at one end thereof by a pin 62 to the face plate 24. The upper end of the dog 60 has a nose portion 64 that is receivable through the slot 42, and engageable with the teeth 40. A bent wire handle 66 is connected at its lower end to the dog 60, and is operable to lift the dog 60 out of engagement with the teeth 40, thereby freeing the ratchet bar 38 for downward movement. It will be appreciated that the handle 44 and the dog 60 can be manipulated to in effect jack the ratchet bar 38 into an elevated position, and that the bar will then remain in such position until the dog 60 is disengaged. It will also be appreciated that the handle 44 and the dog 60 can be manipulated in a reverse manner to move the ratchet bar 38 downwardly, when desired.

The face plate 24 has an inverted, vertical U-shaped slot 70 formed therein, which overlies the ratchet bar 38. The ratchet bar 38 carries a stud bolt 72 on the front face thereof which is slidingly received in the vertical slot 70 as the bar is moved vertically of the bracket 10. The face plate 24 also includes wing portions 74 that extend laterally beyond the base member 12, and said wing portions 74 have nuts 76 welded to the rear face thereof, in alignment with openings 78 provided in the face plate.

The carrier 8 of the invention is used as follows to mount a spare wheel and tire assembly 80, the assembly 80 including a spare wheel 82 having a conventional hub 84 that has an annular array of lug bolt receiving holes 86 therein. The ratchet bar 38 is first lowered, until the stud bolt 72 is aligned with a topmost one of the lug bolt openings 86 in the wheel 82. The wheel 82 is then mounted on the stud bolt 72, and is secured thereto by a suitable securing nut 90. The jack handle 44 and the pivoted dog 60 are then operated to move the ratchet bar 38 and the attached wheel 82 upwardly, until the stud bolt 72 nears the upper end of the U-shaped slot 70, and the nuts 76 are in alignment with corresponding lug bolt openings 86, the nuts 76 being positioned initially for this eventuality. Securing bolts 92 are then inserted, thereby firmly securing the spare wheel 82 in its carriage position.

When it is desired to remove the spare wheel 82, the process is reversed. In this instance, the jack handle 44 and the dog 60 are manipulated to lower the spare wheel 82, after first removing the securing bolts 92. When the wheel 82 is resting on the ground, the securing nut 90 is removed from the stud bolt, and the wheel is then rolled away to where desired. It is readily seen that in both the raising of the wheel 82 into its carriage position, and in the subsequent lowering thereof, no direct lifting of the wheel 82 by the operator is involved. Rather, lifting and lowering is accomplished by the ratchet bar 38, jack handle 44 and dog 60, the operation of the jack handle requiring the exertion of force in an amount that is only a small fraction of the weight of the wheel 82 and its attached tire.

It is, therefore, apparent that a spare wheel carrier has been provided which fully meets the objects hereinabove set forth, and which is both rugged and economical to construct. It is to be understood that the carrier 8 of the invention could be used on other than a logging truck, and that it can be mounted elsewhere on a vehicle than as shown in FIG. 1, at the option and ingenuity of the user. Obviously, many variations and modification of the invention are possible.

I claim:

1. A spare wheel carrier for mounting on a vehicle frame, comprising: a bracket; a ratchet bar having teeth along one edge thereof; means on said bracket mounting said ratchet bar for vertical sliding movement; a jack handle; means pivotally mounting said jack handle on said bracket, whereby said jack handle is engageable with said teeth on said ratchet bar to effect vertical movement thereof; a dog pivotally carried by said bracket, and engageable with said teeth on said ratched bar to prevent downward sliding movement of said ratchet bar; a stud bolt mounted on the central portion of the front face of said ratchet bar for securing a wheel thereto, said bracket having an inverted U-shaped slot for vertically slidingly receiving said stud bolt; and means operable for securing a wheel carried by said stud bolt on said ratchet bar to said bracket when said wheel has been elevated into a carriage position relative to said bracket.

2. A spare wheel carrier as recited in claim 1, wherein said bracket includes spaced, parallel rear and face plates, and wherein said means for slidingly mounting said ratchet bar includes a pair of spaced, parallel vertical guides secured to one of said rear and said face plate.

3. A spare wheel carrier as recited in claim 1, including additionally handle means attached to said pivoted dog for operating the same.

4. A spare wheel carrier as recited in claim 1, wherein said means operable for securing said wheel to said bracket comprises: at least one nut fixed to said bracket, and alignable with a lug bolt opening in the wheel when said wheel has been elevated into its carriage position; and a securing bolt receivable through said aligned lug bolt and threadable into said nut.

5. A spare wheel carrier for mounting on a vehicle frame, comprising: a bracket, including spaced, parallel rear and face plates; a ratchet bar having teeth along one edge thereof; means on said bracket mounting said ratchet bar for vertical sliding movement, including a pair of spaced, parallel vertical guides secured to one of said rear and said face plate; a jack handle; means pivotally mounting said jack handle on said bracket, whereby said jack handle is engageable with said teeth on said ratchet bar to effect vertical movement thereof, said means including a pivot pin extending transversely of said jack handle and projecting from the opposite sides thereof, said back plate and said face plate having confronting slot means for receiving the opposite ends of said pivot pin; a dog pivotally carried by said bracket, and engageable with said teeth on said ratchet bar to prevent downward sliding movement of said ratchet bar; means on the front face of said ratchet bar for securing a wheel thereto; and means operable for securing a wheel carried by said ratchet bar to said bracket when said wheel has been elevated into a carriage position relative to said bracket.

6. A spare wheel carrier for mounting on a vehicle frame, comprising: a bracket, said bracket including spaced, parallel back and face plates; a ratchet bar having teeth along one edge thereof; guide means secured to the rear surface of said face plate, for mounting said ratchet bar on said bracket for vertical sliding movement; a jack handle receivable between said back and said face plates, said plates having confronting slots; pivot pin means carried by said jack handle, the opposite ends of said pivot pin means being receivable in said confronting slots to pivotally mount said jack handle, whereby the inner end thereof can be selectively engaged with said teeth on said ratchet bar; a dog pivotally mounted between said back and said face plates, and engageable with said teeth to prevent downward movement of said ratchet bar; a stud bolt on the front face of said ratchet bar for securing a wheel thereto, said face plate having an inverted U-shaped notch therein for reception of said stud bolt; and at least one nut carried by said face plate, and alignable with a lug bolt opening in a wheel when such wheel has been elevated into a carriage position relative to said bracket.

* * * * *